No. 702,676. Patented June 17, 1902.
B. POLK & T. J. WOOD.
ANIMAL TRAP.
(Application filed Mar. 24, 1902.)
(No Model.) 2 Sheets—Sheet 2.
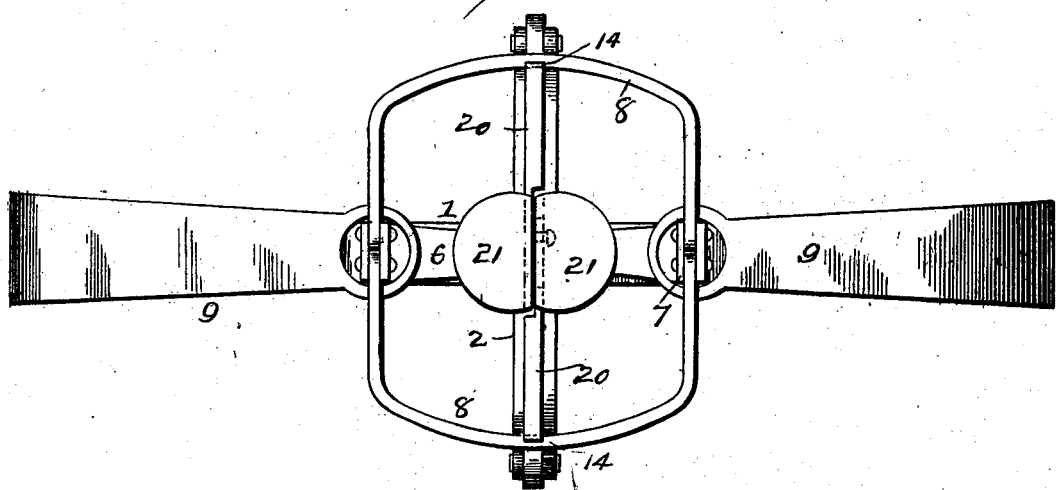
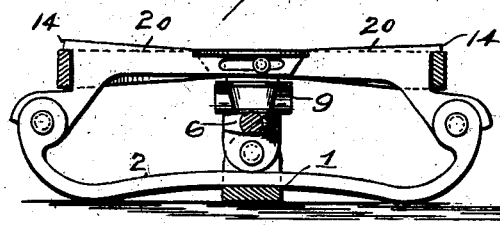
WITNESSES
E. J. Nottingham
G. F. Downing
INVENTORS
B. Polk and
T. J. Wood
By H. A. Seymour
Attorney

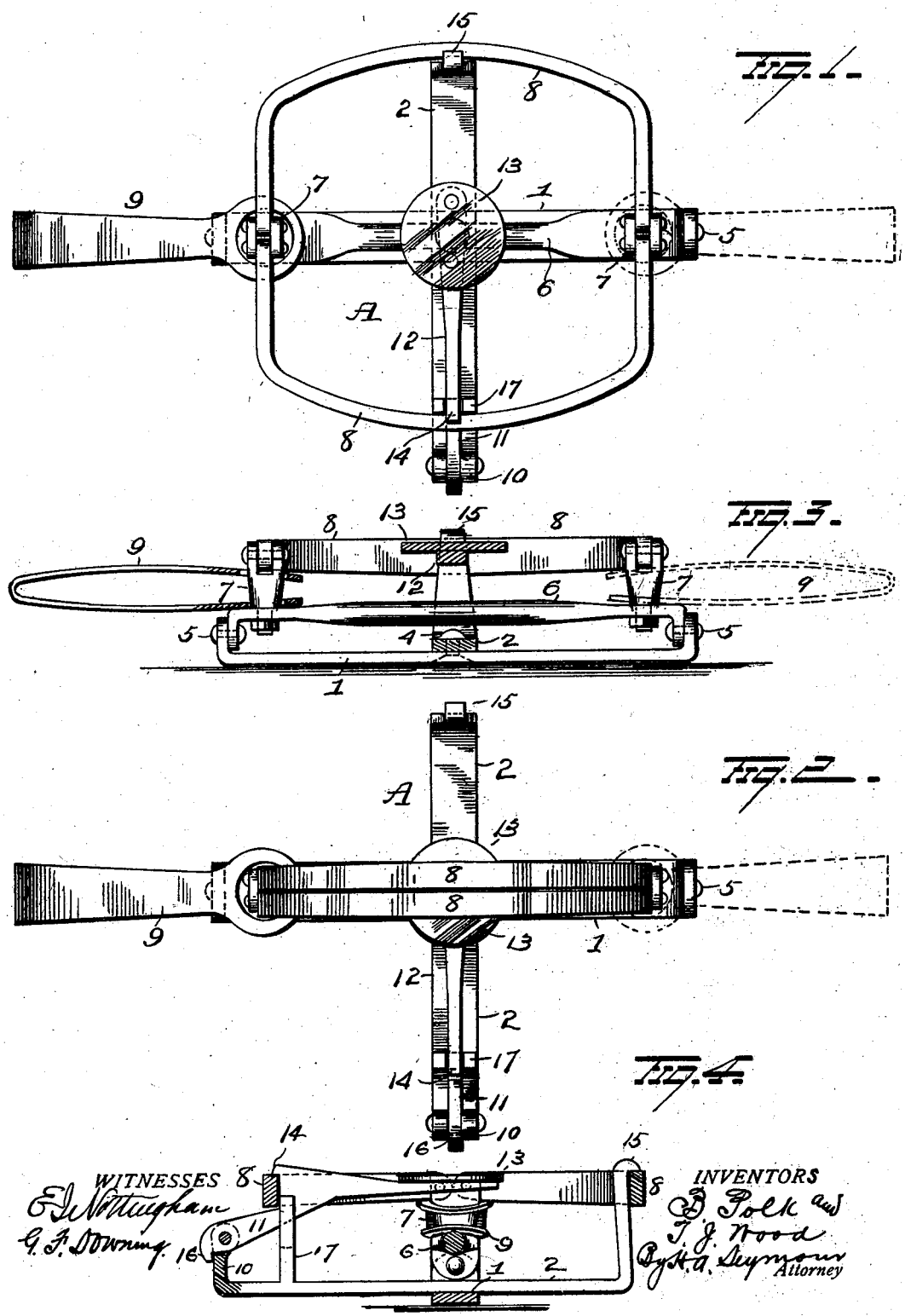

UNITED STATES PATENT OFFICE.

BAYLOR POLK AND THOMAS J. WOOD, OF CLIFF, TERRITORY OF NEW MEXICO.

ANIMAL-TRAP.

SPECIFICATION forming part of Letters Patent No. 702,676, dated June 17, 1902.

Application filed March 24, 1902. Serial No. 99,745. (No model.)

*To all whom it may concern:*

Be it known that we, BAYLOR POLK and THOMAS J. WOOD, of Cliff, in the county of Grant and Territory of New Mexico, have invented certain new and useful Improvements in Animal-Traps; and we do hereby declare the following to be a full, clear, and exact description of the invention, such as will enable others skilled in the art to which it appertains to make and use the same.

Our invention relates to an improvement in animal-traps, and particularly to the class known as "jaw-traps," the object of the invention being to so construct and arrange the several parts that when pressure is applied upon the treadle or actuating-lever the jaws will be released from their set position.

A further object of the invention is to simplify the construction of traps of this character, whereby danger of the accidental displacement, loss, or derangement of the essential parts thereof is avoided.

With these objects in view our invention consists in certain novel features of construction and combinations of parts, as will be hereinafter more fully described, and pointed out in the claims.

In the accompanying drawings, Figure 1 represents a view of our improved trap in its open or set position. Fig. 2 is a view of same in its closed position. Figs. 3 and 4 are sectional views taken at right angles to each other through the center of Fig. 1, and Figs. 5 and 6 are views of a modification.

A represents our improved trap, the base or supporting structure of which comprises a plate 1 and a cross-plate 2, which is located at right angles to plate 1 and is rigidly secured thereto by the rivet 4. The ends of plate 1 are bent upwardly and are each provided with an inwardly-projecting stud 5, on which the respective bent ends of bar 6 are supported, the connection being such as to permit the bar to freely swing back and forth on said studs. This swinging bar 6 is provided near each of its bent ends with an upwardly-projecting post 7, and pivoted in the bifurcated ends of the latter are the ends of the jaws 8 8, which are so supported within said posts as to permit of their being moved away from or toward each other, as occasion may require.

The actuating spring or springs 9 are of the type commonly employed in jaw-traps. Each spring is in the form of a V, the lower member having a head with an opening therethrough which embraces the post 7 below the bifurcated head of the latter, the said opening being smaller than said bifurcated head, so that it is retained against upward movement thereon, but is free to turn laterally on said post. The free end or head of the upper member of this spring is provided with an opening sufficiently large to take in the bifurcated head of the post 7, so that the upper member of the spring can be depressed onto the lower member, and thus leave the jaws free to be opened. When the jaws are closed, this upper member rests well up around the jaws and forms a positive lock therefor, which absolutely prevents the jaws from being opened until the upper member of the spring has been depressed to a point below the pivotal points of the jaws. One spring 9 may be sufficient; but, if desired, one may be employed at each end of the jaws, as shown in the modified form to be hereinafter referred to.

By loosely mounting both members of springs 9 9, as above explained, we are enabled to fold the trap when not in use into a small compass.

Cross-plate 2 is provided with an upwardly-projecting bifurcated end 10, in which is pivotally mounted the depending end 11 of treadle or actuating-lever 12, which latter is provided at its inner end with a platform 13 and at a point directly above its pivotal connection with a projecting lug or catch 14 for engaging the upper or inner edge of one of the jaws 8, while the other jaw is engaged by rigid hook or catch 15, the said hook or catch 15 being formed by bending the opposite end of plate 2 upwardly and outwardly, as shown.

In order to limit the movement of treadle or actuating-lever 12, we have provided same with a shoulder 16, which is so located with respect to the bifurcated end 10 of cross-plate 2 that as soon as the treadle or actuating-lever has been elevated sufficiently for lug or catch 14 to engage its jaw the shoulder will make contact with said end 10 and prevent further upward movement.

Cross-plate 2 is provided with a stop 17, which latter is slotted at its upper end for the free passage and movement of treadle or actuating-lever 12, and in addition to guiding treadle or actuating-lever 12 is also adapted to limit the downward movement of the jaw engaged by lug or catch 14, whereby the springing of the jaws, due to a pressure applied either by design or accident thereon, is absolutely avoided. Hence it will be seen that in order to spring the trap it will be necessary to apply pressure directly upon the platform or on that part of the treadle or actuating-lever adjacent thereto.

To set the trap, the free end or ends of the spring or springs 9 are depressed to points below the pivoted ends of jaws 8 8, after which the latter are opened and swinging or rocking bar 6 turned or rocked sufficiently to carry the positive jaw to the outside of hook or catch 15 and in a position to be engaged thereby. The other jaw or the one hereinafter termed the "advance" jaw is then pressed over post 17, and as soon as it comes in contact therewith the treadle or actuating-lever is elevated and lug or catch 14 brought into locking engagement with said jaw.

Were the jaws supported on a fixed or movable plate it would be impossible to employ a fixed catch for holding one of the jaws, as it is clearly evident that such jaw could not engage the fixed catch. With the jaws mounted on a rocking support the latter can be so rocked as to carry one jaw to the outside of the fixed catch and will necessarily be rocked in the opposite direction to carry the other jaw in its position to engage the catch on the actuating-lever, and it is this rocking movement that carries the jaw into contact with the fixed catch. When the actuating-lever or treadle is depressed, as it must be to release its jaw, the jaw thus released begins to close; but as the other jaw is still held by the fixed catch the spring in its efforts to close the jaw previously released turns the rocking bar, and thus carries the other jaw from under the fixed catch, thus freeing said jaw and permitting it to close. While the jaw retained by the actuating-lever or treadle begins to close before the other jaw, it moves but a slight distance before the other jaw is also released. Hence they come together in a plane but slightly to one side of the vertical center of the trap.

In the form of trap represented in Figs. 5 and 6 two treadles or actuating-levers 20 20 are employed, each of which is constructed substantially like treadle or actuating-lever 12. (Illustrated in Figs. 1, 2, 3, and 4.) These treadles or actuating-levers are loosely connected together adjacent to their inner ends by a pin-and-slot connection, so as to provide for their simultaneous elevation and depression. The platform 21 is made in two sections and are so located on the treadles or actuating-levers as to aline with one another when the latter are in their elevated positions. By dispensing with slotted post or stop 17 and the fixed hook or catch 15 and employing in lieu of the latter a second treadle or actuating-lever adapted to be loosely coupled up with its mate it will be seen that pressure applied on either of the jaws or platform will cause the trap to operate. To set this form of trap, the free ends of springs 9 9 are first depressed to points below the pivoted ends of jaws 8 8, after which the latter are opened and depressed and finally engaged by the catches 14, which latter operation is accomplished by simply elevating the loosely-connected inner ends of the treadles or actuating-levers 20 20.

This trap is not only capable of being sprung in the usual manner common in traps of this type—that is, by exerting pressure upon the platform—but is also capable of being operated when pressure is exerted upon either of its jaws or upon either or both of its treadles or actuating-levers. Should an animal tread upon either of the jaws and exert pressure sufficient to spring the trap, the jaw upon which the animal stands will be held against movement, but the opposite jaw will be free to approach its mate and by the assistance of swinging bar 6, upon which the jaws are pivotally mounted, be brought into engagement with the depressed jaw, or rather in a position to effect a capture of the animal operating the trap, and by mounting the jaws on a swinging or rocking bar the jaws are free to swing over toward the animal, thus operating to carry the jaws well under the foot, so as to get a firm and substantial grip thereon.

It is evident that changes in the construction and relative arrangement of the several parts might be made without avoiding our invention, and hence we would have it understood that we do not restrict ourselves to the particular construction and arrangement of parts shown and described; but, Having fully described our invention, what we claim as new, and desire to secure by Letters Patent, is—

1. In a jaw-trap, the combination with a base or support and means carried thereby for locking the spring-actuated jaws in their open position, of a swinging bar mounted on said base or support, and spring-actuated jaws pivotally supported on said swinging bar.

2. In a jaw-trap, the combination with a swinging bar and a pair of spring-actuated jaws mounted thereon, of a fixed and a movable catch for engaging said spring-actuated jaws.

3. In a jaw-trap, the combination with a base or support, a fixed and a movable catch carried thereby, of a swinging bar mounted on the base or support, and spring-actuated jaws pivotally supported on said swinging bar, one of said jaws engaging the movable catch and the other the fixed catch.

4. In a jaw-trap, a base or support comprising two plates secured together at right angles to one another, one of said plates being provided with a fixed and a movable catch, of a swinging bar mounted on the other member of said base or support and spring-actuated jaws pivotally supported on said swinging bar and adapted to engage the fixed and movable catches, substantially as set forth.

5. In a jaw-trap, the combination with a base or support and jaw-holding devices carried on said support, of a swinging bar mounted on the base or support, and spring-actuated jaws pivotally supported on said swinging bar and adapted to engage the jaw-holding devices.

6. The combination with a rocking bar and jaw-holding devices, of jaws mounted on said rocking bar and adapted to be engaged by said devices and V-shaped springs for actuating said jaws, the said springs being mounted on the studs or posts carrying the jaws, substantially as set forth.

In testimony whereof we have signed this specification in the presence of two subscribing witnesses.

BAYLOR POLK.
THOMAS J. WOOD.

Witnesses:
ED. A. LAYNE,
F. P. JONES.